(12) United States Patent
Huang (10) Patent No.: US 7,748,432 B2
(45) Date of Patent: Jul. 6, 2010

(54) COLLAPSIBLE AUTO SHADE

(76) Inventor: Sunny En Luing Huang, 786 Via Monte Video St., Claremont, CA (US) 91711

( * ) Notice: Subject to any disclaimer, the term of this patent is extended or adjusted under 35 U.S.C. 154(b) by 1138 days.

(21) Appl. No.: 11/026,990

(22) Filed: Dec. 30, 2004

(65) Prior Publication Data

US 2005/0115689 A1   Jun. 2, 2005

Related U.S. Application Data (63) Continuation of application No. 10/610,848, filed on Jun. 30, 2003, now abandoned, which is a continuation-in-part of application No. 10/307,482, filed on Dec. 2, 2002, now abandoned, which is a continuation-in-part of application No. 10/116,946, filed on Apr. 8, 2002, now Pat. No. 6,691,762, which is a continuation-in-part of application No. 09/766,557, filed on Jan. 19, 2001, now Pat. No. 6,561,257, which is a continuation of application No. 09/417,277, filed on Oct. 13, 1999, now Pat. No. 6,192,967, said application No. 10/307,482 is a continuation-in-part of application No. 10/118,549, filed on Apr. 8, 2002, now Pat. No. 6,705,381, and a continuation-in-part of application No. 09/766,557, filed on Jan. 19, 2001, now Pat. No. 6,561,257, which is a continuation of application No. 09/417,277, filed on Oct. 13, 1999, now Pat. No. 6,192,967.

(60) Provisional application No. 60/104,703, filed on Oct. 19, 1998, provisional application No. 60/284,967, filed on Apr. 19, 2001.

(51) Int. Cl.
*B60J 3/00* (2006.01)

(52) U.S. Cl. .............................. 160/370.21; 160/DIG. 2
(58) Field of Classification Search ............ 160/370.21, 160/DIG. 2, DIG. 3, 127, 128, 237, 377, 160/387; 296/97.7, 97.8
See application file for complete search history.

(56) References Cited

U.S. PATENT DOCUMENTS

| | | |
|---|---|---|
| 1,384,574 A | 7/1921 | Stanton et al. |
| 1,475,647 A | 11/1923 | Naterman |
| 1,732,447 A | 10/1929 | Crane |
| 1,790,333 A | 1/1931 | Tubman |
| 1,808,652 A | 6/1931 | Gump |

(Continued)

FOREIGN PATENT DOCUMENTS

CZ       9400267 A3     11/1995

(Continued)

*Primary Examiner*—David Purol
(74) *Attorney, Agent, or Firm*—Paul M. Denk (57) ABSTRACT

A support assembly for a collapsible automobile shade such as a pleated or folding screen which can be selectively moved between a collapsed position for storage and an open position for placement in a vehicle window. The support assembly consists of one or more arcuate compressible members which extend beyond the perimeter of the pleated or folding screen. Each of the arcuate compressible members is resiliently compressible, for the purpose of conforming to an edge or perimeter of an automobile window in which the shade is installed, while maintaining the screen in an open position, thereby supplying an expansive force to hold the shade in place in the open position. The shade can also be provided with a pocket.

3 Claims, 11 Drawing Sheets

U.S. PATENT DOCUMENTS

| | | | |
|---|---|---|---|
| 2,065,242 A | 12/1936 | Omerly, Jr. |
| 2,489,901 A | 11/1949 | Kocinski |
| 2,596,836 A | 5/1952 | Bruhl |
| 2,598,770 A | 6/1952 | Drozt |
| 2,599,066 A | 6/1952 | Osborn |
| 2,614,630 A | 10/1952 | Moszelt |
| 2,751,977 A | 6/1956 | Pinkerton |
| 2,843,421 A | 7/1958 | Shelton |
| 2,979,129 A | 4/1961 | Ketchum |
| 3,046,048 A | 7/1962 | Cheney |
| 3,184,264 A | 5/1965 | Ealey et al. |
| 3,336,969 A | 8/1967 | Marchman |
| 3,373,792 A | 3/1968 | Lessard |
| 4,227,542 A | 10/1980 | Bonfilio |
| 4,332,414 A | 6/1982 | Surtin |
| 4,560,245 A | 12/1985 | Sarver |
| 4,606,572 A | 8/1986 | Maguire |
| 4,620,749 A | 11/1986 | McEachern |
| 4,652,039 A | 3/1987 | Richards |
| 4,671,558 A | 6/1987 | Cline |
| 4,681,149 A | 7/1987 | Tung-Chow |
| 4,699,195 A | 10/1987 | Lester |
| 4,736,980 A | 4/1988 | Eubanks |
| 4,759,271 A | 7/1988 | Bliemeister |
| 4,763,947 A | 8/1988 | Gregg |
| 4,784,215 A | 11/1988 | Sing |
| 4,790,591 A | 12/1988 | Miller |
| 4,818,007 A | 4/1989 | Mahoney |
| D301,449 S | 6/1989 | Silva |
| 4,861,090 A | 8/1989 | Gavrieli |
| 4,862,943 A | 9/1989 | Shafia |
| 5,010,939 A | 4/1991 | King |
| 5,010,943 A | 4/1991 | Boyer |
| 5,024,262 A | 6/1991 | Huang |
| 5,035,460 A | 7/1991 | Huang |
| 5,116,273 A | 5/1992 | Chan |
| 5,207,257 A | 5/1993 | Rupel et al. |
| 5,213,147 A | 5/1993 | Zheng |
| 5,553,908 A | 9/1996 | Shink |
| 5,598,883 A | 2/1997 | Platsis |
| 5,628,357 A | 5/1997 | Hwang |
| 5,657,810 A | 8/1997 | Levy et al. |
| 5,660,220 A | 8/1997 | Ruan |
| 5,687,786 A | 11/1997 | Tsai |
| 5,694,998 A | 12/1997 | Chen |
| 5,765,619 A | 6/1998 | Arnold |
| 5,785,106 A | 7/1998 | Hwang |
| 5,845,697 A | 12/1998 | Zheng |
| 5,927,793 A | 7/1999 | McGrath, Jr. |
| 5,967,161 A | 10/1999 | Neal |
| 6,098,349 A | 8/2000 | Zheng |
| 6,192,967 B1 | 2/2001 | Huang |
| 6,363,955 B1 | 4/2002 | Louie |
| 6,491,052 B1 | 12/2002 | Zheng |
| 6,502,596 B1 | 1/2003 | Danaher |
| 6,527,136 B1 | 3/2003 | Sabounjian |
| 2001/0039959 A1 | 11/2001 | Zheng |

FOREIGN PATENT DOCUMENTS

| | | |
|---|---|---|
| FR | 1256866 | 2/1961 |
| IT | 000689866 B | 4/1965 |

COLLAPSIBLE AUTO SHADE

CROSS-REFERENCE TO RELATED APPLICATIONS

This is a continuation of application Ser. No. 10/610,848 filed Jun. 30, 2003, now abandoned which is a continuation-in-part of application Ser. No. 10/307,482 filed Dec. 2, 2002, now abandoned, which is a continuation-in-part of application Ser. No. 10/116,946 filed Apr. 8, 2002, now U.S. Pat. No. 6,691,762, which is a continuation-in-part of application Ser. No. 09/766,557 filed Jan. 19, 2001, now U.S. Pat. No. 6,561,257, which is a continuation of application Ser. No. 09/417,277, filed Oct. 13, 1999, now U.S. Pat. No. 6,192,967, which claims benefit of provisional application Ser. No. 60/104,703, filed Oct. 19, 1998. application Ser. No. 10/307,482, noted above, also is a continuation-in-part of 10/118,549 filed Apr. 8, 2002, now U.S. Pat. No. 6,705,381, which claims priority to provisional application Ser. No. 60/284,967, filed Apr. 19, 2001 and a continuation-in-part of application Ser. No. 09/766,557 filed Jan. 19, 2001, now U.S. Pat. No. 6,561,257, which is a continuation of application Ser. No. 09/417,277, filed Oct. 13, 1999, now U.S. Pat. No. 6,192,967, which claims benefit of provisional application Ser. No. 60/104,703, filed Oct. 19, 1998. All of the above noted applications and patents are incorporated herein by reference.

BACKGROUND OF THE INVENTION

The present invention relates generally to collapsible shades designed to for fitment in a window, such as of an automobile, so as to protect the interior by preventing the entrance of damaging sun rays and the generation of damaging heat, and in particular, to a support structures biasing collapsible or folding windows shades in an automobile window and against adjacent fixtures. Numerous styles of window screens and shades adapted for use in automobiles have long been available in the art. For example, U.S. Pat. No. 5,035,460 for an automobile window protector, and which is incorporated herein by reference, shows the fabrication of such a screen, made of flexible material, and which could be applied to either the interior or exterior of the window of an automobile. In addition, U.S. Pat. No. B1 5,024,262, and which is incorporated herein by reference, shows a compactly foldable automobile sunshade, which provides for inherent resiliency, at least around its perimeter loop, to hold the shade in an opened configuration, and to provide sunlight protection at the vicinity of the automobile window, but which is capable of significant reduction in size through the folding of the frame into a more compact arrangement for suitable for storage.

During use, an automobile windows shade is typically installed adjacent an automobile window, blocking incoming sunlight or providing interior privacy. However, if the automobile window and the shade do not have exactly the same dimensions, the shade may not function as desired. For example, if the window shade is smaller than the window in which it is installed, it may not stay in place without the aid of fasteners or ties to hold it to the window. Alternatively, if the shade is larger than the window in which it is installed, the shade may bow or wrinkle when fitted into the perimeter of the window, leaving gaps or causing damage to the shade.

Accordingly, there is a need for an automobile window shade support assembly which permits a collapsible or folding automobile window shade to securely fit within a wide variety of automobile windows of varying shapes and sizes which are larger than the shade without bowing, wrinkling, or experiencing damage, and without the need for fasteners or ties.

SUMMARY OF THE INVENTION

Briefly stated, the present invention comprises a support assembly for a collapsible automobile shade material such as a pleated or folding screen which can be selectively moved between a collapsed position for storage and an open position for placement in a vehicle window. The support assembly consists of one or more flexible members which extend beyond the perimeter of the shade material. Each of the flexible members is resiliently compressible, for the purpose of conforming to an edge or perimeter of an automobile window in which the shade is installed, while maintaining the screen in an open position, supplying an expansive force to hold the shade material in place in the open position.

In a second embodiment, each of the flexible members comprising the support assembly is adjustable to alter the extension of each of the flexible members beyond the perimeter of the shade material. A slide clasp is configured to permit each flexible member to slide along the perimeter of the shade, between a fully extended position having maximum displacement from the perimeter of the shade material, and a retracted position adjacent the perimeter of the shade material. Each flexible member is configured to adjust as required to facilitate the installation of the shade in automobile windows of varying shapes and sizes.

In a third embodiment, the support assembly includes one or more rigid mounting elements spaced about the perimeter of the collapsible automobile shade. Each rigid mounting element is configured to grip or seat on an edge or perimeter of an automobile window in which the shade is installed, supplying a holding force to secure the shade in place in the open position.

In a fourth embodiment, the support assembly for a rectangular collapsible automobile shade includes one or more flexible members which extend beyond the perimeter of the shade material in combination with one or more rigid mounting elements. The rigid mounting elements are disposed at the corners of the collapsible shade, and are interconnected by the flexible members, which provide an expansive force to seat the rigid mounting elements against the edge or perimeter of an automobile window in which the shade is installed in an open position.

The compressible members can be formed from either one section or two sections of metal bands. If formed from two sections, then the two metal bands can be joined together by appropriate means, such as a clamp.

The material from which the screens of the shades are made can be stretchable. Preferably, the screen material is stretchable in two opposed directions. The foregoing and other objects, features, and advantages of the invention as well as presently preferred embodiments thereof will become more apparent from the reading of the following description in connection with the accompanying drawings.

BRIEF DESCRIPTION OF THE DRAWINGS

In the accompanying drawings which form part of the specification.

DESCRIPTION OF THE PREFERRED EMBODIMENT

Figures 1, 1A:
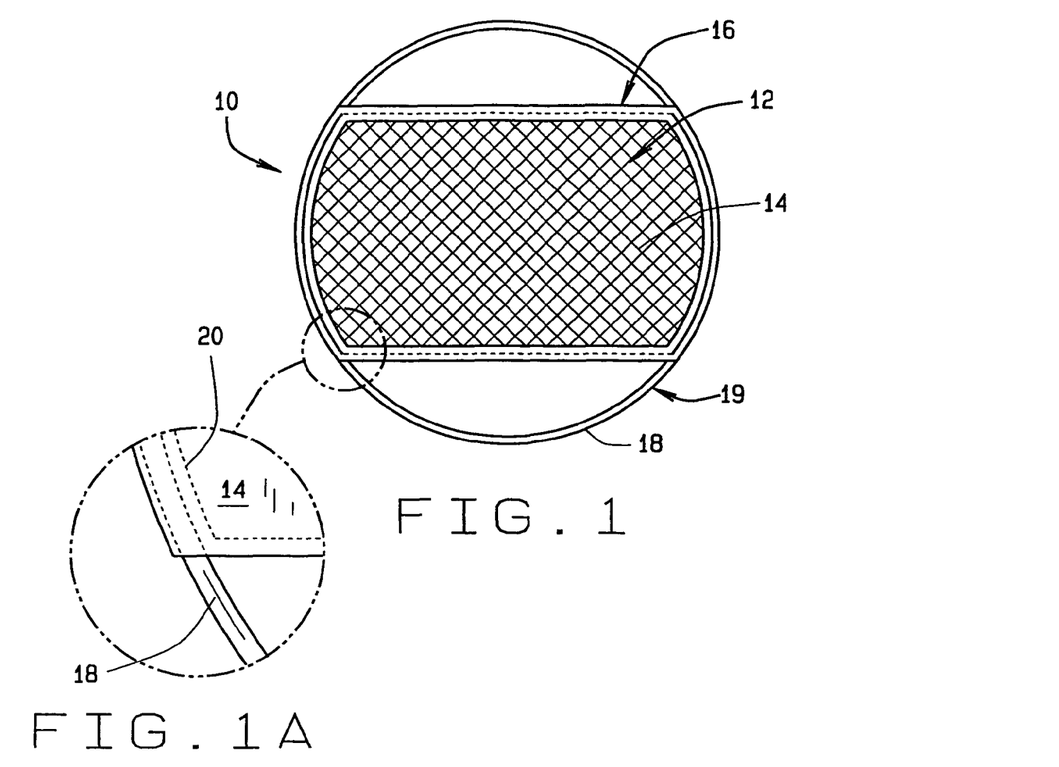
FIG. 1 is front view of one embodiment of the collapsible automobile shade of the present invention, illustrating a circular support assembly integrated with a generally rectangular screen.
FIG. 1A is an enlarged view of the mounting of the screen to the frame of the shade.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. In referring to the drawings, and in particular to FIG. 1, one embodiment of the support structure 10 associated with a collapsible automobile shade 12 is disclosed. The collapsible automobile shade 12 includes a shaped screen 14 of fabric-like material which may be cloth, mesh, polymer, or even Mylar. Preferably, the material easily deforms into any shape without a memory. When the automobile shade 12 is expanded, as shown in FIG. 1, the shaped screen 14 is held in an open configuration, in this particular instance being generally rectangular, and which can be used as a sun shade or privacy screen, internally of an automobile windshield or window. The outer edge 16 of the shaped screen 14 defines a perimeter boundary or border, which in this illustrative embodiment is made from simply rolling the outer edge back on itself and securing the edge by sewing.

Figure 2:
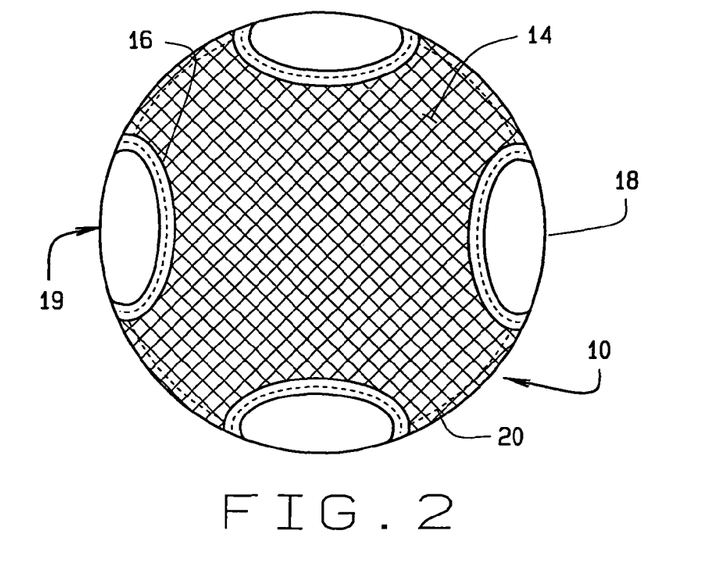
FIG. 2 is front view of one embodiment of the collapsible automobile shade of the present invention, illustrating a circular support assembly integrated with a generally square screen.

It will be recognized by those of ordinary skill in the art that the particular shape for the shaped screen 14 may undertake various configurations, and such shapes may include the rectangular form as shown in FIG. 1, a square form as shown in FIG. 2, an oval, circular, or truncated configuration, depending upon the particular automobile make and model for which the screen is intended for use.

As seen in the embodiments of FIGS. 1 and 2, the support structure 10 comprises a spring-like compressible member 18 extending beyond a portion of the outer edge 16 of the shaped screen 14. The compressible member 18 is a single continuous length of spring-like or resiliently compressible material, such as a thin metal band having an inherent shape memory, forming a circular framework 19 for supporting the shaped screen 14 in an open configuration. The spring-like or resilient nature of the compressible member 18 permits the collapsible automobile shade 12 to be reversibly twisted in upon itself in a conventional manner, into a compact and overlapping collapsed configuration suitable for storage. Preferably, the compressible member 18 and the shaped screen 14 are coupled by incorporating the compressible member 18 into the outer edge 16 or border of the shaped screen 14.

Figure 3:
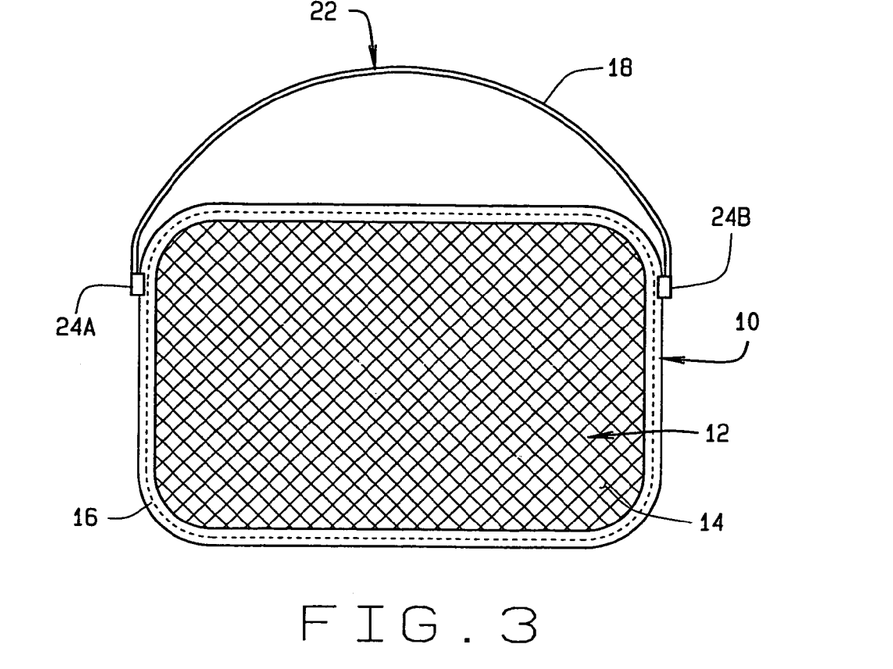
FIG. 3 is a front view of one embodiment of the collapsible automobile shade if the present invention, illustrating a flexible member support assembly disposed adjacent one edge of a rectangular screen.
Figure 4:
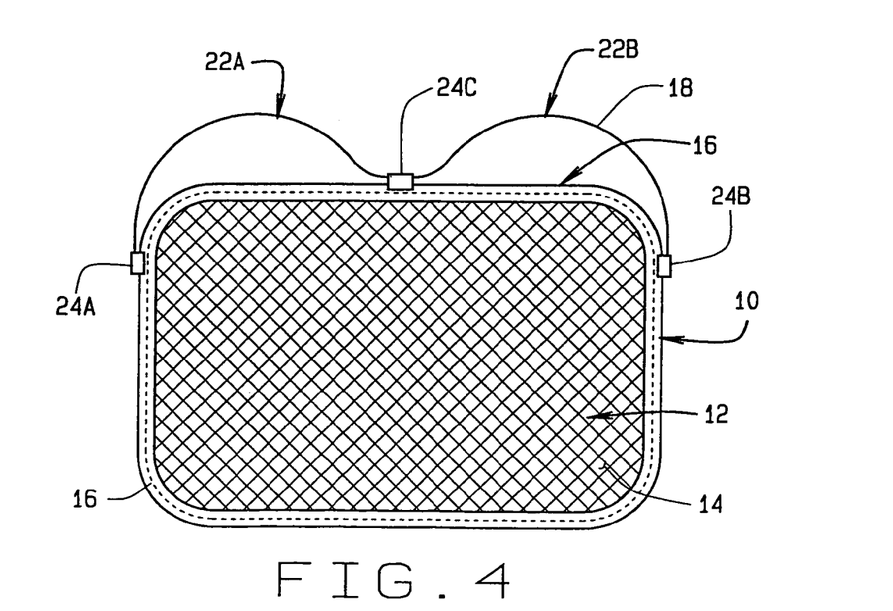
FIG. 4 illustrates the flexible support member of FIG. 3 secured to the edge of the rectangular screen, defining a pair of compressible bulges.

In a third embodiment, shown in FIG. 3, a single compressible member 18 forms an arcuate framework 22 for supporting the shaped screen 14 in an open configuration. The arcuate framework 22 is secured to the perimeter boundary of the shaped screen 14 in a conventional manner at two fixed attachment points 24A, 24B, such as by crimping or clamping. Alternatively, as shown by a variation of the third embodiment in FIG. 4, the arcuate framework 22 may include a centrally disposed third fixed attachment point 24C, forming a pair of arcuate elements 22A, 22B adjacent one edge of the shaped screen 14 from the single compressible member 18.

Figure 5:
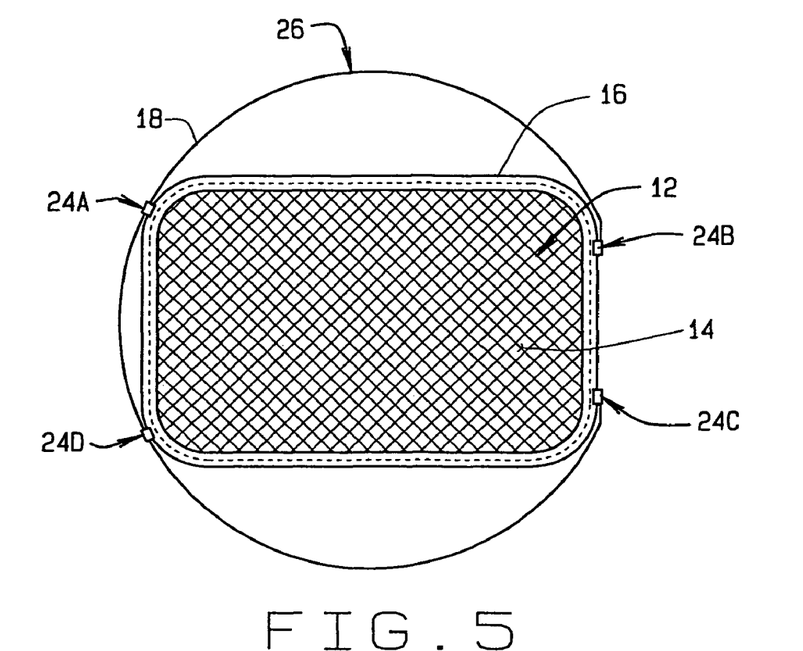
FIG. 5 is front view of one embodiment of the collapsible automobile shade of the present invention, illustrating a circular support assembly secured to a generally rectangular screen.

In a fourth embodiment shown in FIG. 5, a single compressible member 18 is disposed in a circular configuration 26 about the outer edge 16 of the shaped screen 14, in an open configuration. Unlike the embodiment shown in FIG. 1, the shaped screen 14 in this embodiment is secured to the compressible member 18 by a plurality of fixed attachment points 24A, 24B, 24C, and 24D in spaced relationship about the perimeter boundary of the shaped screen 14.

Figure 6:
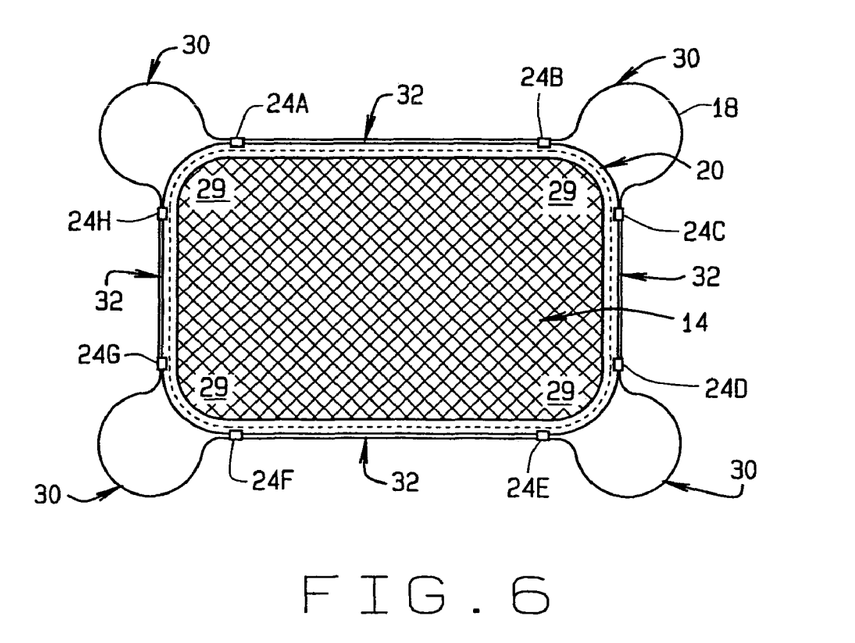
FIG. 6 is a front view of one embodiment of the collapsible automobile shade of the present invention, illustrating a support assembly consisting of a plurality of flexible members secured adjacent to the corners of a generally rectangular screen.

In a fifth embodiment shown in FIG. 6, a single compressible member 18 is disposed about the outer edge 16 of the shaped screen 14 in an open configuration. The compressible member 18 is secured to the outer edge 16 of the shaped screen 14 by a plurality of fixed attachment points 24A-24H, such that portions 30 of the compressible member 18 adjacent corner regions 29 of the shaped screen 14 are spaced apart there from and, as shown, for segments of circles, while portions 32 of the compressible member 18 adjacent the elongated sides of the shaped screen 14 are substantially parallel there to.

Figure 7:
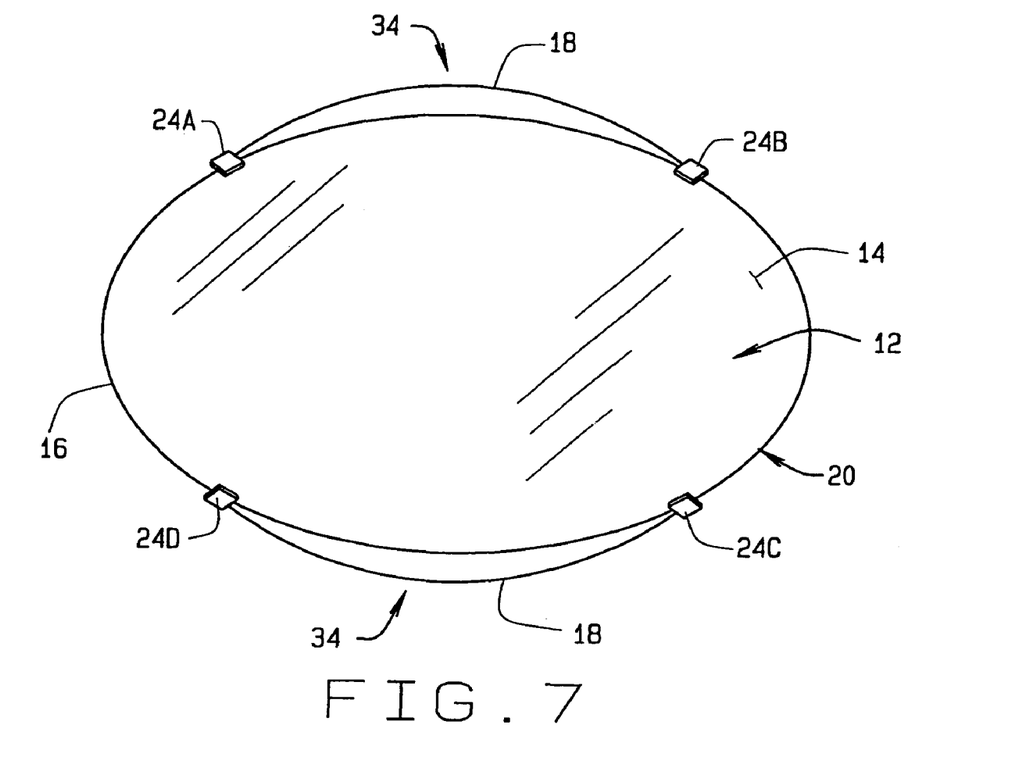
FIG. 7 is a perspective view of one embodiment of the collapsible automobile shade of the present invention, illustrating a support assembly consisting of a plurality of opposing flexible members secured to the perimeter of a circular screen.

In a sixth embodiment shown in FIG. 7, a pair of compressible members 18 are disposed in spaced relationship about the outer edge 16 of the shaped screen 14 in an open circular configuration. Each compressible member 18 forms an arcuate framework 34 spaced apart from the outer edge 16 for supporting the shaped screen 14 in an open configuration. Each arcuate framework 34 is secured to the perimeter boundary of the shaped screen 14 at two fixed attachment points 24A, 24B and 24C, 24D, respectively.

Figure 8:
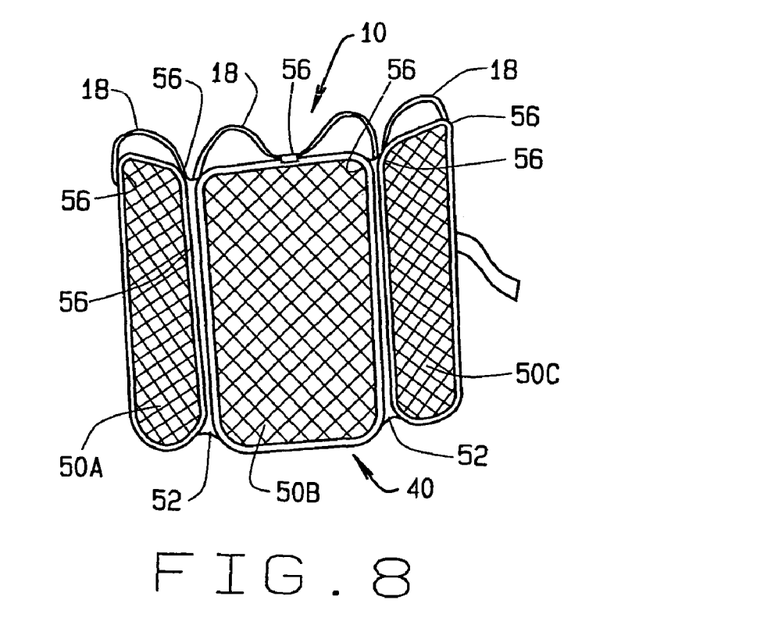
FIG. 8 is a perspective view of a three-piece folding automobile shade, with each piece including the flexible support member of FIG. 3.

In a seventh embodiment shown in FIG. 8, the support structure 10 is adapted for use with a conventional folding automobile shade 40 comprising a number of rigid shade panels 50A, 50B, and 50C. The shade 40 is configured to fold in a conventional manner along seams 52 disposed between each shade panel 50A, 50B, and 50C, from an open configuration to a closed configuration. The adapted support structure 10 includes a compressible member 18 associated with each rigid shade panel 50A, 50B, and 50C. Each compressible member 18 forms an arcuate framework 54 for supporting the associated rigid shade panel 50A, 50B, and 50C in an open configuration, and is secured to an outer edge of the associated rigid shade panel at two or more fixed attachment points 56.

Figure 9:
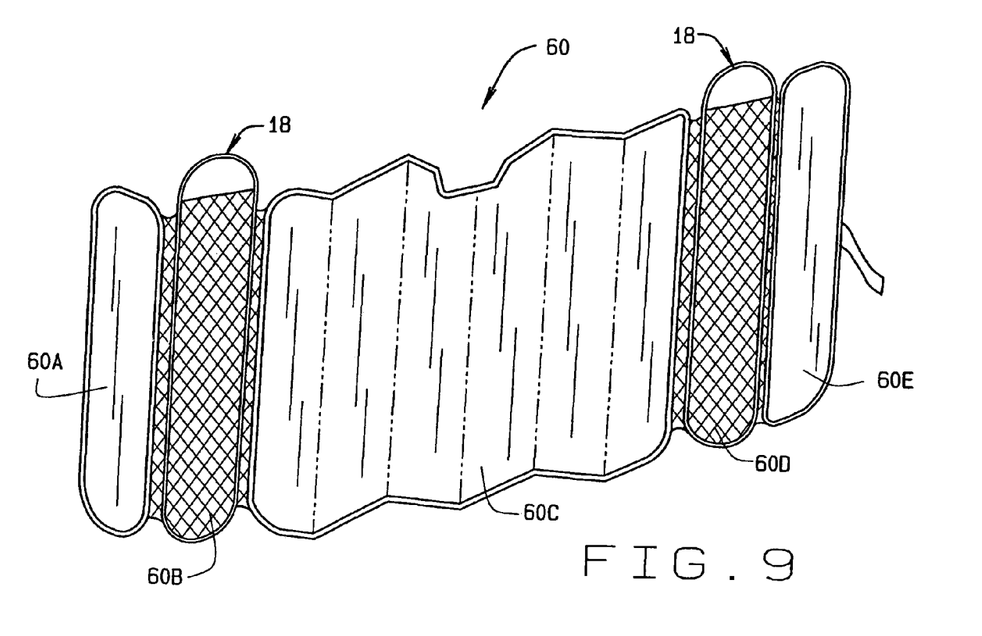
FIG. 9 is a perspective view of a multi-piece folding automobile shade, with a pair of pieces including the flexible support member of FIG. 3.

In a variation on the seventh embodiment, shown in FIG. 9, only a limited number of the individual rigid shade panels 60A-60E comprising a conventional folding automobile shade 60 are provided with associated compressible members 18 of the support structure 10.

Figure 10:
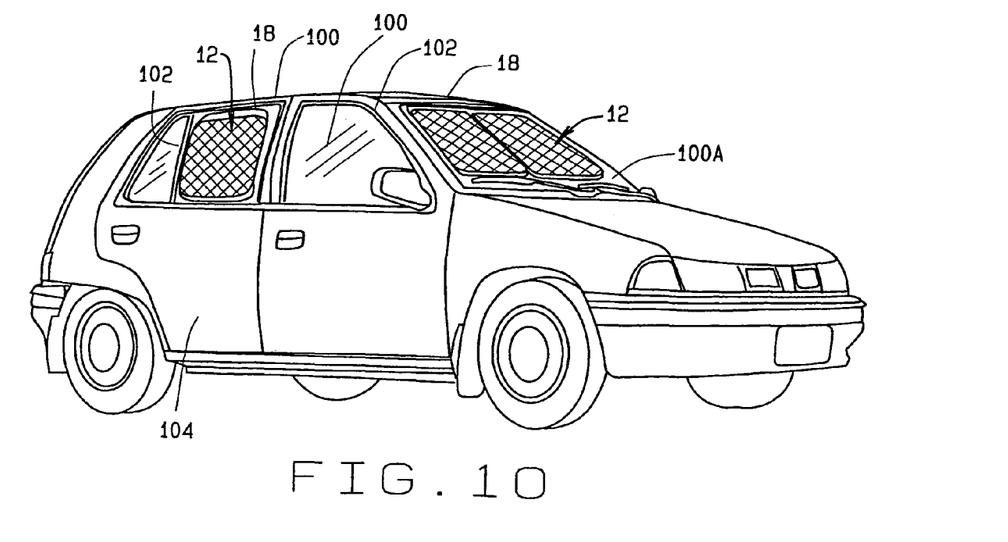
FIG. 10 is a perspective view of an automobile with various embodiments of the collapsible automobile shades installed in the front and side windows.
Figure 11:
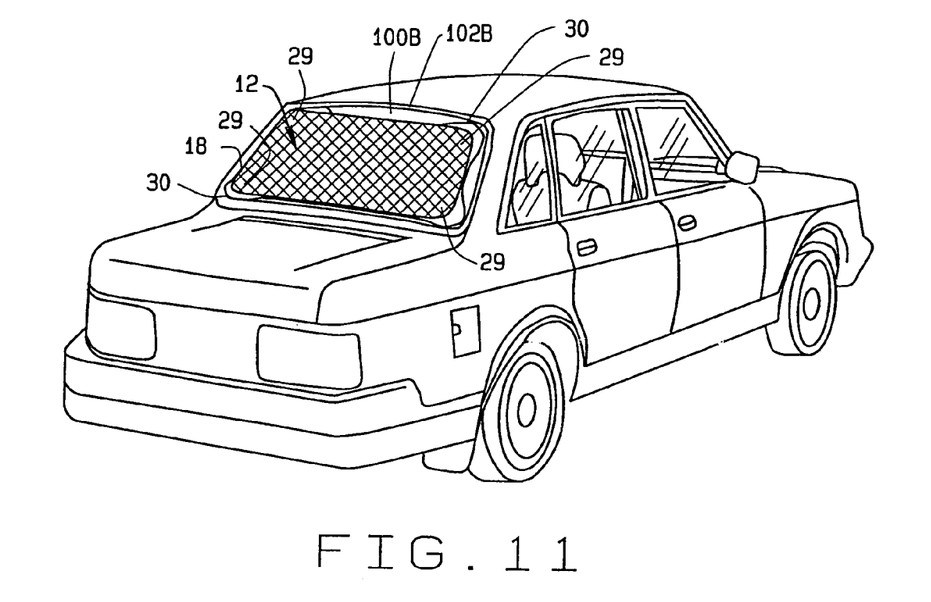
FIG. 11 is a perspective view of an automobile with the embodiment of the collapsible automobile shade of FIG. 6 installed in the rear window.

FIGS. 10 and 11 illustrate the use and operation of the support structure 10 of the present invention to secure a collapsible automobile shade 12 in an automobile window 100. A collapsible automobile shade 12 is initially unfolded or expanded to a fully open configuration such as shown in FIGS. 1-9. Preferably, the shade 12 is selected to include a shaped screen 14 having overall dimensions equal to or smaller than those of the frame 102 of the automobile window 100 in which it is to be installed, and to include a compressible member 18 such that the combined maximum dimensions of the support structure 10 and the shaped screen 14 are greater than at least one corresponding dimension of the automobile window 100. For example, it is preferable that for an automobile window having a 20.0 inch height dimension, a collapsible automobile shade 12 be selected to have a height of the shaped screen 14, combined with that of the compressible member 18, which exceed 20.0 inches.

When installed against the automobile window 100, the components of the support structure 10 are reversibly deformed and compressed to fit within the frame 102, providing tensioned support for the shaped screen 14 by transferring the compressive loads to the outer edge 16 of the shaped screen 14. For example, turning to FIG. 10, an embodiment of the present invention shown in FIG. 1 is shown installed in the automobile window 100 of a rear door 104. A pair of similar automobile shades 12 is seen installed in the windshield 100A. The compressible member 18, initially defining a circular framework 19 within which the shaped screen 14 is held, is deformed and compressed by the frame 102 into a substantially rectangular configuration, reducing the spacing between the shaped screen 14 and the compressible member 18 above and below the shaped screen 14. The inherent shape memory of the spring-like compressible member 18 resists compression by the window frame 102, exerting an outwardly directed holding force against the window frame 102, maintaining the automobile shade 12 in position against the window 100.

Each embodiment of the support structure 10 shown in FIGS. 1-9 is utilized in a similar manner to that described above. As shown in FIG. 11, the embodiment of the present invention shown in FIG. 6 is illustrated in use to secure an automobile shade 12 in an open configuration against a rear window 100B of an automobile. Specifically, each of the portions 30 of the compressible member 18 adjacent corner regions 29 of the shaped screen 14 is compressed against the corresponding corners of the rear window frame 102B, providing a tensioning support to maintain the automobile shade 12 in place against the rear window 100B.

Figure 12:
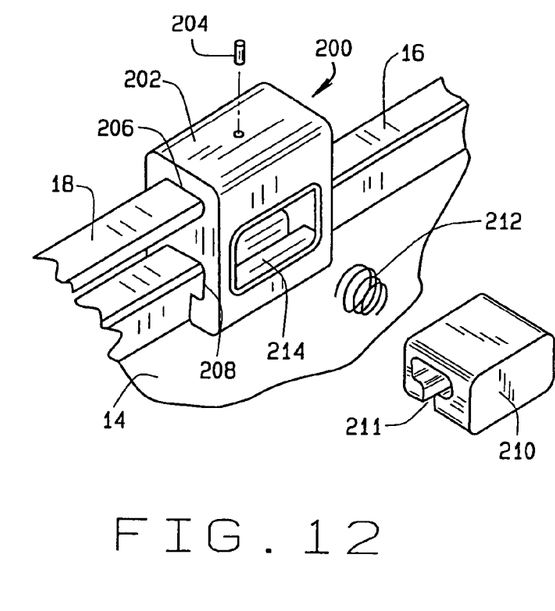
FIG. 12 is an exploded perspective view of a sliding clamp assembly utilized to secure a flexible support member of the present invention to an automobile shade perimeter.
Figure 13:
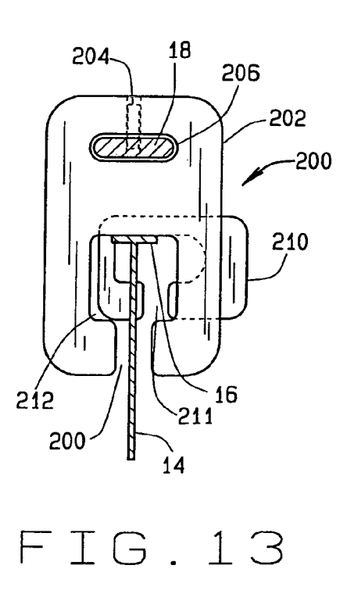
FIG. 13 is a sectional view of the sliding clamp assembly of FIG. 12.

For some applications of the support structure 10, it is desirable to alter the spacing between the compressible members 18 and the shade material 14, so as to permit an automobile shade 12 including the support structure 10 to be utilized in automobile windows 100 having a wide range of dimensions. Turning to FIGS. 12 and 13, an alternate embodiment of the support structure 10 is shown to include a slide coupler 200 utilized in place of a fixed attachment point to secure the compressible member 18 to the outer edge 16 of the shade material 14. The slide coupler 200 consists of a coupler body 202 which is secured to one end of the compressible member 18, preferably by a locking dowel 204 or other conventional attachment means passing through the compressible member 18 seated in a recess 206, and engaging the coupler body 202. The coupler body 202 further includes a channel 208 into which the outer edge 16 of the automobile shade 12 is seated. A release button 210, biased by a spring 212 is seated in a bore 214 intersecting the channel 208. The release button 210 includes a second channel 211 aligned parallel with the channel 208, and is biased by spring 212 to exert a locking pressure against the outer edge 16, securing the slide coupler 200 against sliding movement relative to the outer edge 16. When in the biased (locking) position, a portion of the release button 210 protrudes from the bore 214, beyond the face of coupler body 202.

When depressed inward towards the coupler body 202, the release button 210 compresses the spring 212, and shifts the second channel 211 into longitudinal alignment with the channel 208. When channel 208 and the second channel 211 are in longitudinal alignment, the slide coupler 200 is capable of sliding movement along the outer edge 16. When released, the release button 210 is biased outward from the coupler body 202 by the spring 212, moving the second channel 211 into parallel alignment with the channel 208, and trapping a portion of the outer edge 16 there between. The trapped portion of the outer edge 16 resists sliding movement by the slide coupler 200, securing the compressible member 18 in a fixed location relative thereto.

Using the slide coupler 200 it is possible to alter the spacing between the compressible members 18 and the shade material 14, so as to permit an automobile shade 12 including the support structure 10 to be utilized in automobile windows 100 having a wide range of dimensions. Specifically, by sliding the slide coupler 200, and accordingly, the compressible member 18 along the outer edge 16 of the automobile shade 12, the displacement of portions of the compressible member 18 from the outer edge 16 will either increase or decrease, permitting use of the automobile shade and support structure 10 in either larger or smaller windows.

Figure 14:
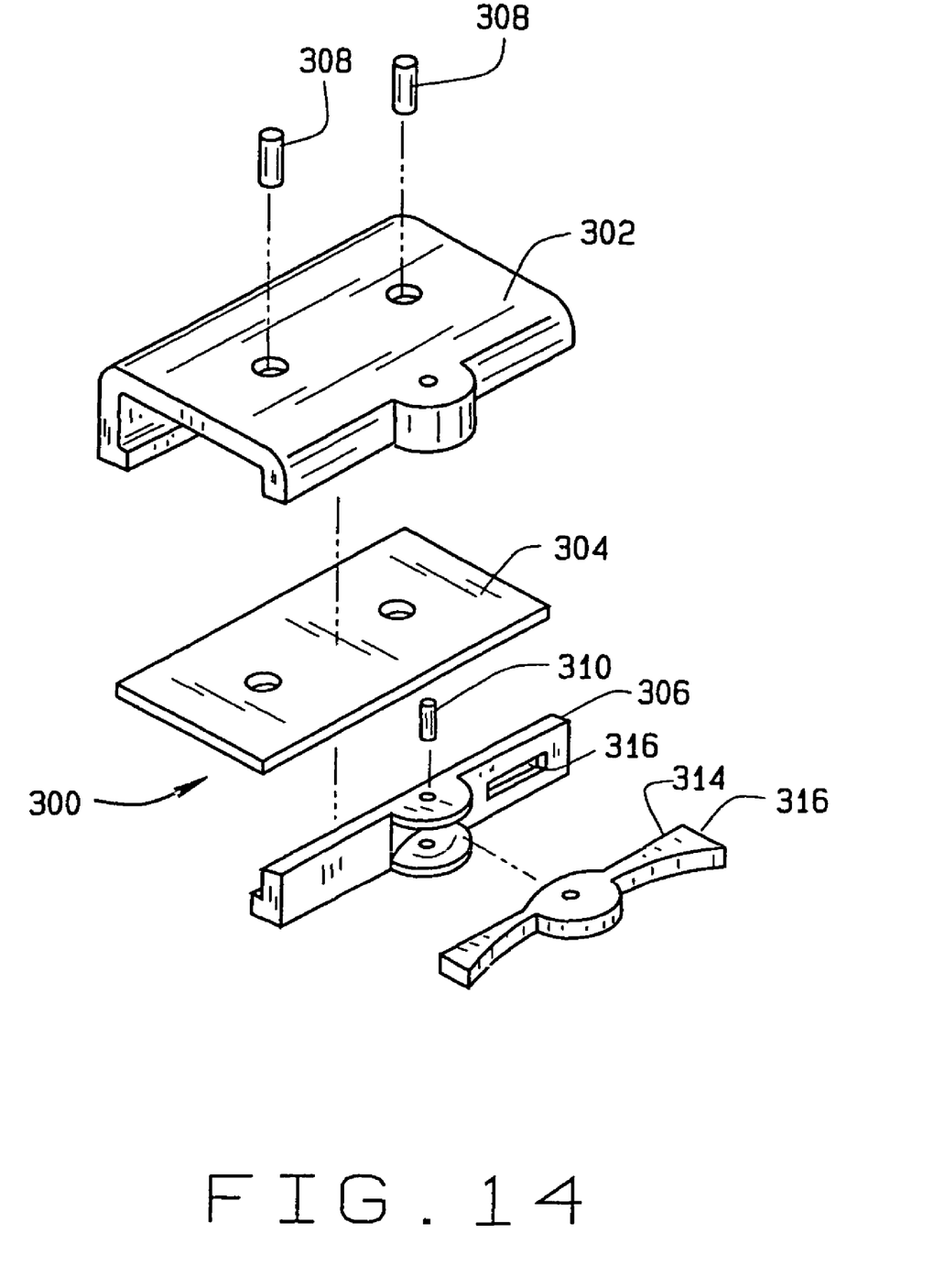
FIG. 14 is an exploded perspective view of an alternate embodiment sliding clamp assembly.
Figure 15:
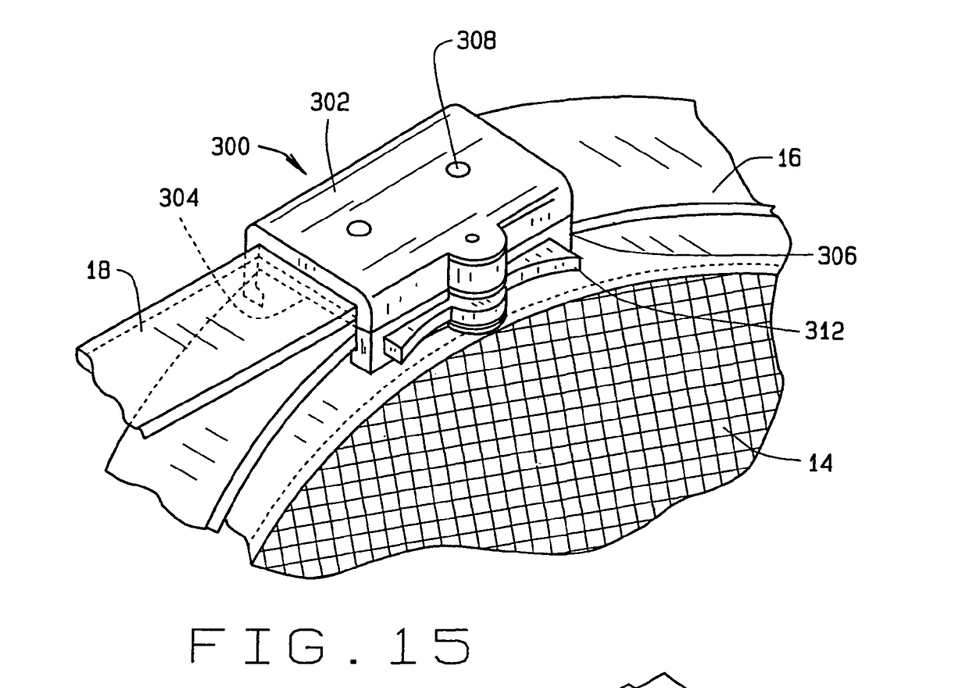
FIG. 15 is a perspective of the alternate embodiment sliding clamp assembly of FIG. 14.

Turning to FIGS. 14 and 15, a first alternate embodiment of the slide coupler suitable for use on an automobile shade 12 having a rigid outer edge 16 is shown. The slide coupler 300 includes an upper clamp plate 302, a lower clamp plate 304, and a face plate 306. One end of a compressible member 18 is secured between the upper clamp plate 302 and the lower clamp plate 304 by a pair of locking dowels 308 passing through aligned bores in the clamp plates and the compressible member 18. The face plate 306 is bonded to an edge of the upper clamp plate 302, and provides a pivot 310 for a cam lever 312. The cam lever 312 includes a cam surface 314 in alignment with an opening 316 in the face plate 306.

As best seen in FIG. 15, when installed as part of a support structure 10, the slide coupler 300 is secured to a rigid outer edge 16 of an automobile shade by the lower retaining lip 318 on the upper clamp plate 302 and the face plate 306. The rigid outer edge 16 is further aligned with the opening 316 in the face plate 306, such that the cam surface 314 is engaged thereto. Depressing the cam lever 312 rotates the cam surface 314 about the pivot 310, away from the outer edge 16, permitting the slide coupler 300 and attached compressible member 18 to slide along the outer edge 16. When a desired position is reached, the cam lever 312 is released, and the cam surface 314 again engages the outer edge 16 through the opening 316, securing the slide coupler 300 in a fixed position relative to the outer edge 16.

Figure 16:
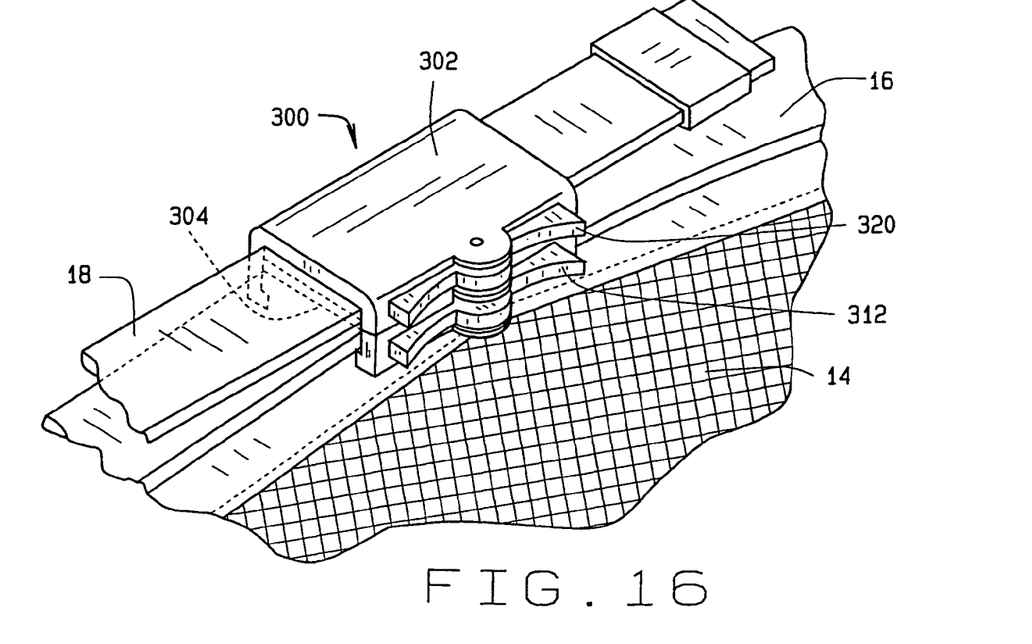
FIG. 16 is a perspective view of another alternate embodiment sliding clamp assembly.

Turning to FIG. 16, a variation of the slide coupler 300 is shown to include a second cam lever 320 in place of the locking dowels 308. The second cam lever 320 operates identically to the cam lever 312, but instead engages an edge of the compressible member 18 through a correspondingly positioned opening. Absent the engagement of the second cam lever 312, the compressible member 18 is free to slide through the slide coupler 300. When engaged by the second cam lever 312, the compressible member 18 is fixed in place relative to the slide coupler 300. By providing a pair of cam levers 312, 320, the slide coupler location may be moved about the outer edge 16 of the automobile shade 12, and the length of the compressible member 18 may be adjusted by controlled movement through the slide coupler 300.

Figures 17, 21:
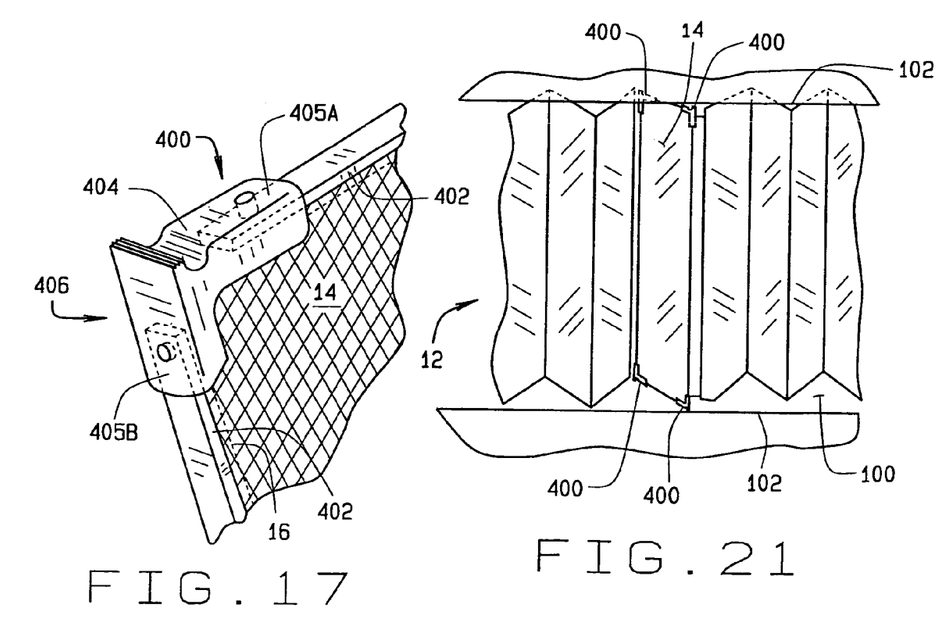
FIG. 17 is a perspective view of a rigid mounting element utilizes to secure an automobile shade to a vehicle window perimeter.
FIG. 21 is a front view of one embodiment of a folding automobile shade of the present invention with a pair of rigid mounting elements of FIG. 17 disposed on either end of an expanding support shaft.
Figures 18, 19:
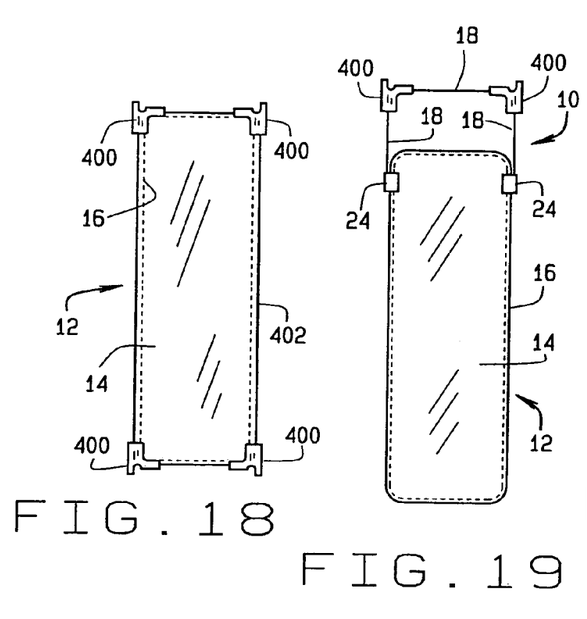
FIG. 18 is a front view of one embodiment of a collapsible automobile shade of the present invention with a plurality of rigid mounting elements of FIG. 17.
FIG. 19 is a front view of one embodiment of a collapsible automobile shade of the present invention with a pair of rigid mounting elements of FIG. 17 disposed on a flexible support member of FIG. 3.
Figure 20:
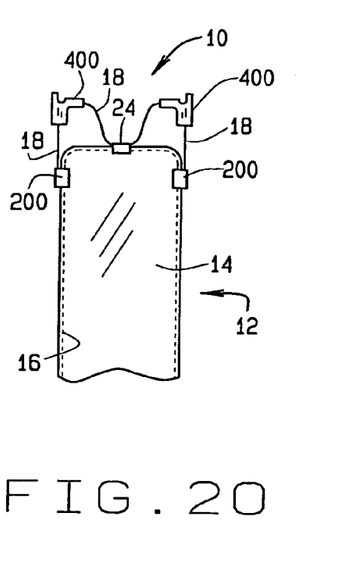
FIG. 20 is a front view of one embodiment of a collapsible automobile shade of the present invention with a pair of rigid mounting elements of FIG. 17 disposed on a flexible support member of FIG. 4.

To facilitate holding an automobile shade 12 in a vehicle window, one or more rigid mounting elements 400, such as shown in FIG. 17 through FIG. 21 may be utilized. Preferably, a plurality of rigid mounting elements 400 are disposed in a spaced relationship about the perimeter of the automobile shade 12, at each corner of the shade material 14 or support structure 10. Each rigid mounting element 400 is secured to either a framework 402 incorporated into the outer edge 16 of the shade material 14, or to elements of the support structure 10, such as a compressible member 18. Preferably, each rigid mounting element 400 includes an L-shaped body 404 defining a pair of extensions 405A, 405B, and having a friction surface 406 disposed at the apex. Each extension 405A and 405B is configured to receive either a portion of the framework 402 as shown in FIGS. 17, 18, and 21, or elements of the support structure 10 as shown in FIGS. 19 and 20, in a fixed relationship.

During use, when the automobile shade 12 is in an open configuration such as shown in FIG. 21, and placed in a window 100 of an automobile, the friction surface 406 on each rigid mounting element 400 seats against the framework 102 surrounding the window 100, to provide a positive contact against which the automobile shade 12 and/or support structure 10 can exert a holding force to maintain the automobile shade 12 in place adjacent the window 100.

Figures 22, 23:
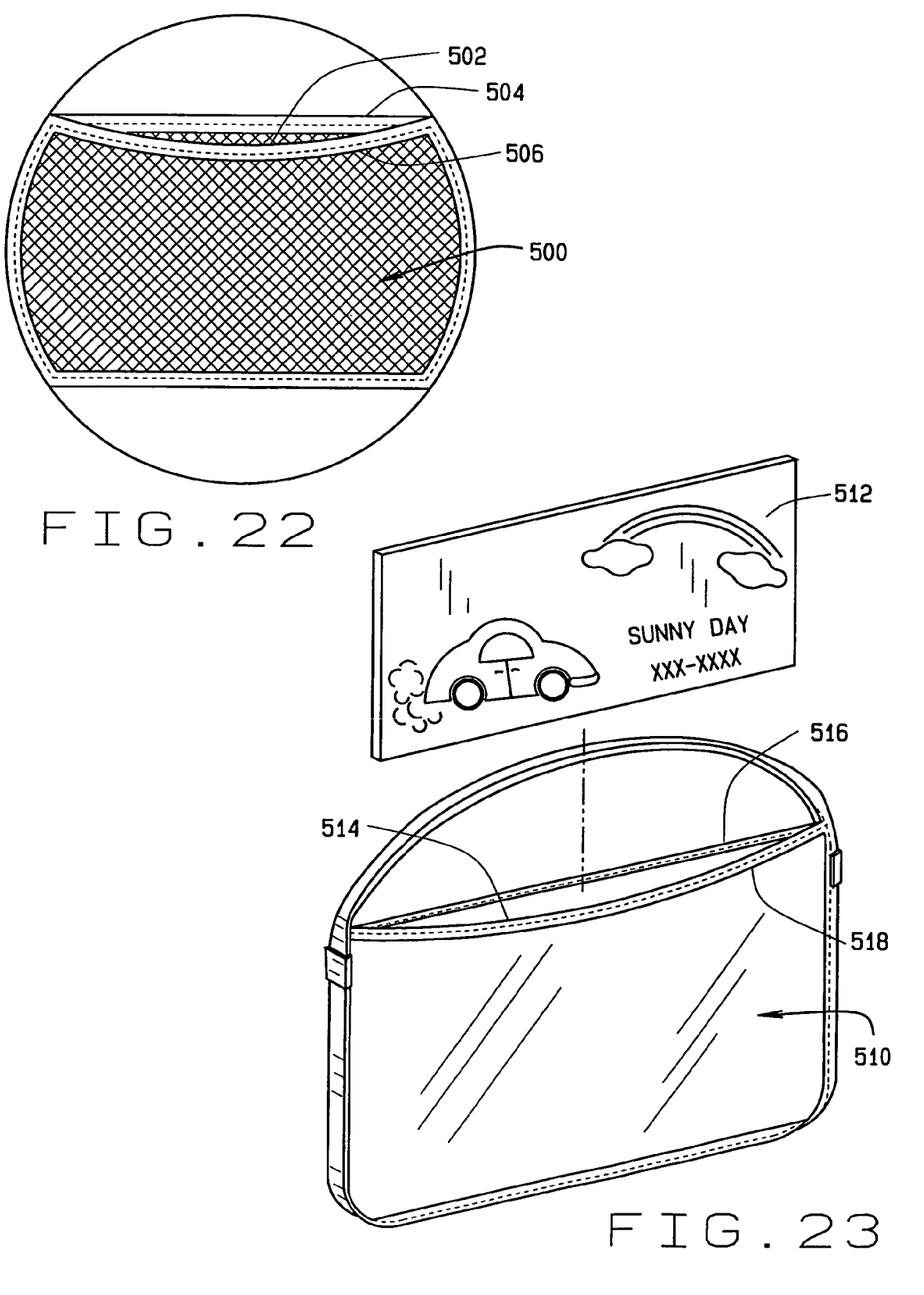
FIG. 22 is a perspective view of an alternative shade, similar to the shade of FIG. 1, but provided with a pocket.
FIG. 23 is a perspective view of an alternative shade, similar to the shade of FIG. 3, but provided with a pocket and showing that a sign can be placed in the pocket.

An alternative shade 500 is shown in FIG. 22. The shade 500 is similar to the shade 10 of FIG. 3, but which is provided with a pocket 502. The shade 500, like the shade 10, includes a screen 504. To form the pocket 502, the shade is provided with a second layer 506 of material which overlies the first layer 504 of screening material. The second layer 506 of material is preferably as wide as the first layer of screening material 504, so that the two layers of material can be joined at their periphery. Additionally, the lower edge of the second layer 506 is joined to the lower edge of the first layer 504, to form a bottom of the pocket 502. Although the layer 506 is shown to have a height equal to the height of the layer 504, the second layer can have a height less than the height of the first layer, in which case, the pocket 502 will have a depth less than the height of the screen 504. Additionally, the second layer 506 can be mounted to the first layer 504, such that the bottom of the second layer (and hence the bottom of the pocket 502) are above the bottom of the first layer 504. A second pocketed shade 510 is shown in FIG. 23. The shade 510 is constructed similarly to the shade of FIG. 3 and is provided with a pocket in the same manner as discussed above in conjunction with the shade 500. The shade 510 is shown to be able to receive a plaque or sign 512. This sign 512 can simply be decorative. Alternatively, the sign 512 can contain a message, such as "Send Help". To facilitate insertion of the sign 512 into the pocket 514 of shade 510, the first and second layers 516 and 518 are preferably made from stretchable material. Further, the material from which the layers are made can stretch along two axes so that the material can be stretched in two opposing directions (i.e., widthwise and heightwise). Additionally, to enable the plaque 512 to be seen, the second layer 518 of material is preferable transparent or made from an open mesh.

Figure 24:
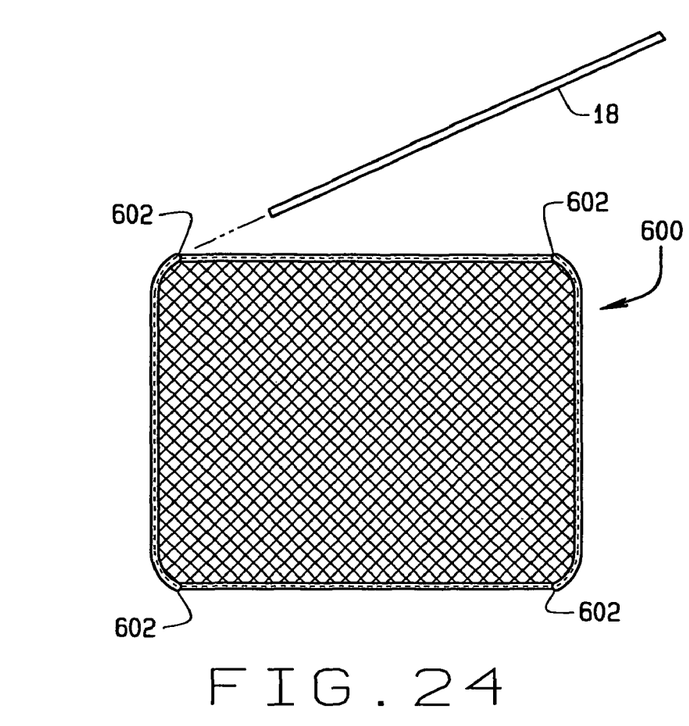
FIGS. 24 and 25 are plan views showing alternative manners of applying the compressible member to the shade Corresponding reference numerals indicate corresponding parts throughout the several figures of the drawings.
Figure 25:
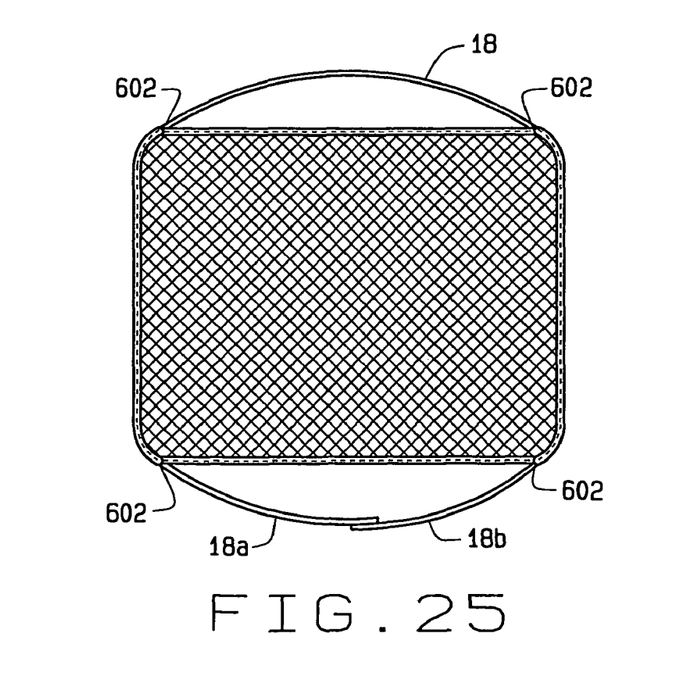

In FIGS. 24 and 25, a shade 600 is shown which is similar to the shade 10 of FIG. 3. However, in the shade 600, the perimeter of the screen forms pockets or openings 602, there being two opposed openings 602 along the top edge of the screen and two opposed openings 602 along the bottom edge of the screen. The compressible member 18 is then received in opposed openings 602, as shown in FIGS. 24 and 25. As seen in FIG. 24, the compressible member 18 can be formed from a single piece, in which case, the member 18 has a length greater than the length of the edge of the shade 600, such that the compressible member will bow or bend outwardly from the screen of the shade. As seen in FIG. 25, the compressible member can be comprised of a pair of shorter members 18a,b, which have a combined length greater than that of the edge of the shade. The ends of the two members 18a,b are then joined together by an appropriate connector.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. A shade for use in a vehicle comprising:

a pocket assembly having two or more edges defining a continuous perimeter boundary, one edge is open thus denoting the top of said shade, and the other edges are closed; and, more than one compressible members stiffening said closed edges, being contiguous with a portion of the perimeter boundary of said pocket assembly, and each extending beyond the remaining portion of the perimeter boundary of said pocket assembly, said compressible members are adapted to fit said shade snugly within the window frame of a vehicle;

whereby said pocket assembly receives an item through said open edge for storage or display generally vertically disposed.

2. The shade of claim 1 further comprising:

said pocket assembly having two or more layered material portions each generally rectangular in shape and of open mesh or transparent construction, said portions hemmed upon two lateral edges and one longitudinal edge leaving the other longitudinal edge open.

3. The shade of claim 2 further comprising:

said open edge having two opposite ends;

a first compressible member extending from each end of said open edge and away from said pocket assembly; and, a second compressible member extending from said closed edge opposite said first compressible member and away from said pocket assembly.

* * * * *